(12) United States Patent
Hellige et al.

(10) Patent No.: US 12,294,178 B2
(45) Date of Patent: May 6, 2025

(54) HIGH-POWER PLUG CONNECTION SYSTEM

(71) Applicant: HARTING Electric Stiftung & Co. KG, Espelkamp (DE)

(72) Inventors: Denny Hellige, Bad Oeyenhausen (DE); Walter Gerstl, Breitenfurt bei Wien (AT); Albert Ferderer, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 332 days.

(21) Appl. No.: 17/914,406

(22) PCT Filed: Mar. 8, 2021

(86) PCT No.: PCT/DE2021/100235
§ 371 (c)(1),
(2) Date: Sep. 26, 2022

(87) PCT Pub. No.: WO2021/190698
PCT Pub. Date: Sep. 30, 2021

(65) Prior Publication Data
US 2023/0103502 A1 Apr. 6, 2023

(30) Foreign Application Priority Data
Mar. 27, 2020 (DE) ...................... 10 2020 108 458.7

(51) Int. Cl.
*H01R 13/53* (2006.01)
*B61G 5/10* (2006.01)
(Continued)

(52) U.S. Cl.
CPC .......... *H01R 13/53* (2013.01); *H01R 13/516* (2013.01); *H01R 13/52* (2013.01); *H01R 25/162* (2013.01); *B61G 5/10* (2013.01); *H01R 2201/26* (2013.01)

(58) Field of Classification Search
CPC ...... H01R 13/53; H01R 13/516; H01R 13/52; H01R 25/162; H01R 2201/26; G61G 5/10
(Continued)

(56) References Cited

U.S. PATENT DOCUMENTS

| 4,891,016 A | 1/1990 | Luzzi et al. |
| 5,679,016 A | 10/1997 | Marder et al. |

(Continued)

FOREIGN PATENT DOCUMENTS

| CA | 2702342 A1 | 12/2010 |
| CN | 202363597 U | 8/2012 |

(Continued)

*Primary Examiner* — Gary F Paumen
(74) *Attorney, Agent, or Firm* — Smartpat PLC (57) ABSTRACT

A high-power plug connection system has a cable connection housing for connecting at least two electric high-power plug connectors in order to transmit and/or distribute a high current strength and/or a high electric voltage. The cable connection housing receives at least two insulating bodies for receiving at least one respective high-power contact and at least one electrically conductive rail in an interior. The rail is designed to establish an electrically conductive connection between the at least two high-power contacts, and the insulating bodies protrude at least partly out of the interior through a respective housing opening and into a connection region, the connection region being designed to receive the high-power plug connector.

23 Claims, 5 Drawing Sheets

(51) Int. Cl.
*H01R 13/516* (2006.01)
*H01R 13/52* (2006.01)
*H01R 25/16* (2006.01)

(58) Field of Classification Search
USPC ..................................... 439/569, 181, 278
See application file for complete search history.

(56) References Cited

U.S. PATENT DOCUMENTS

| | | | |
|---|---|---|---|
| 11,148,687 B2 * | 10/2021 | Jaskiewicz | ............. H02G 11/00 |
| 2014/0008169 A1 | 1/2014 | Kawasaki et al. | |
| 2020/0239045 A1 | 7/2020 | Jaskiewicz et al. | |

FOREIGN PATENT DOCUMENTS

| | | |
|---|---|---|
| CN | 103283100 A | 9/2013 |
| DE | 4135391 C1 | 12/1992 |
| DE | 202011050247 U1 | 8/2012 |
| DE | 102017222101 | 5/2019 |
| EP | 2746129 A1 | 6/2014 |
| EP | 2665147 B1 | 10/2015 |
| EP | 3470296 A1 | 4/2019 |
| JP | 2004224221 A | 8/2004 |
| WO | 2012095895 A1 | 7/2012 |
| WO | 2012095916 A1 | 7/2012 |

* cited by examiner

HIGH-POWER PLUG CONNECTION SYSTEM

TECHNICAL FIELD

The disclosure relates to a high-power plug connection system. High-power plug connection systems are required to transmit and/or distribute high electrical voltages and high electrical currents. Attention is particularly focused on applicability in underfloor areas of rail vehicles, in particular the connection of power cars and self-propelled railcars to one another.

BACKGROUND

Solutions are known in the prior art which enable the transmission and/or distribution of high electrical currents and/or voltage between vehicles or between vehicles with modules coupled to them. However, these solutions mostly provide disadvantageous and partially undetachable fixing of the corresponding contact elements. Furthermore Particular disadvantages of the prior art are the inconvenient maintenance, the rigid design of the system, and generally also a high weight and considerable space requirement. Because of the high power requirement in modern passenger rail transportation, the previous solution from the prior art is outdated and inefficient. However, especially in the case of highly stressed contact elements, such as for example in the field of rail transportation, there is a growing need for repair and maintenance, for example, owing to increased electrical erosion or electrical corrosion caused by the high current strengths of over 500 A up to a few thousand amperes and voltages of over 500V up to several kilovolts.

In the priority application for the present application, a search by the German Patent and Trademark Office yielded the following prior art: DE 41 35 391 C1.

SUMMARY

The object of the disclosure consists in providing a versatile high-power plug connector for the transmission and/distribution of high currents and/or voltages.

The object is achieved by the subject of the independent claims.

Advantageous embodiments of the invention are provided in the subclaims and the following description.

The embodiment proposes a high-power plug connection system having a cable connection housing for connecting at least two electrical high-power plug connectors for the purpose of transmitting and/or distributing high electrical current strength and/or high electrical voltage. The cable connection housing is designed to accommodate at least two insulating bodies and at least one electrically conductive busbar in an interior. The insulating bodies for accommodating at least in each case one high-power contact and the busbar for establishing an electrically conductive connection are here provided between the at least two high-power contacts. The insulating bodies furthermore project at least partially through in each case one housing perforation from the interior into a connection region, wherein the connection region is designed to receive the high-power plug connectors.

The cable connection housing can thus be employed at least as a coupling for at least two high-power plug connectors. Ideally, a cable connection housing according to the invention is designed as a distributor. In particular, the cable connection housing is designed as a Y distributor. The cable connection housing is advantageously designed as a T distributor. The cable connection housing is furthermore advantageously designed as an H distributor. The cable connection housing is likewise conceivably designed as an X distributor.

The term "high-power plug connector" refers to a plug connector which is provided for connection to the cable connection housing. In particular, the high-power plug connector according to the invention is configured as a single-pole plug connector. High-power plug connectors of this type are also as single-pole. The high-power plug connector is especially designed to transmit a high electrical current strength and/or a high electrical voltage to the cable connection housing.

A "high electrical current strength" means a current strength of over 100 amperes. In particular, it means a current strength of over 500 amperes. Very particularly, it means a current strength of over 800 amperes. A current strength of 1000 amperes is also conceivable.

The term "high electrical voltage" should be understood to mean a voltage or over 1 kilovolt. In particular, it means a voltage of over 10 kilovolts. Very particularly, it means a voltage of over 15 kilovolts. A current strength of 25 kilovolts is also conceivable.

A "housing perforation" refers to an opening in the cable connection housing. This housing perforation leads from an interior of the cable connection housing into the surrounding outer region. The outer region surrounding the cable connection housing is configured as a connection region, at least in the region surrounding the housing perforations.

A "connection region" is understood to mean the above-mentioned outer region of the cable connection housing. The connection region is here formed according to the invention in such a way that a high-power plug connector is guided to an insulating body, situated in a housing perforation, and connected to it in an electrically conductive fashion. Media-tight sealing of the interior at the corresponding point is afforded according to the invention by the connection of a high-power plug connector to the connection region. For this purpose, the housing of the high-power plug connector is formed in such a way that the housing engages in a connection region designed so that it is fundamentally congruent. Both the said high-power plug connector and/or the connection region of the cable connection housing are provided with a seal for the purpose of improved sealing.

In a further embodiment, the cable connection housing is designed with a housing top side shaped so that it is fundamentally concave.

A housing top side is understood in this context to mean in particular the housing wall which is connected to a support structure, situated opposite the housing top side, for example of a vehicle or a transportation element coupled to it. An exemplary embodiment here discloses a housing top side, the concave shape of which runs from a left-hand side to a right-hand side. The highest deflection of the concave shape is thus situated in a fundamentally centrally arranged longitudinal axis of the cable connection housing. The highest deflection of the concave shape of the housing top side is oriented in a fundamentally centrally arranged transverse axis of the cable connection housing. The highest deflection of the concave shape of the housing top side is ideally arranged fundamentally in the region of a center point of the cable connection housing. The center point can be chosen as a point which is defined as the point of intersection of the longitudinal axis and the transverse axis. A concave housing top side first has the advantage that foreign media, in particular water, dirt, and dust, can flow off or be washed off simply from the housing upper surface.

An embodiment provides that the cable connection housing has at least two recesses which make it possible to connect the cable connection housing to a support structure.

Recesses mean, for example, depressions which can accommodate bolts, pins, screws, threaded pins, or comparable connecting elements in them. For example, such a recess is configured as a groove along an outer side of the cable connection housing. The groove can here be profiled in such a way that the groove has an outward facing opening through which a connecting element can be completely or at least partially passed.

The recesses are alternatively configured as a through hole through which bolts, pins, screws, threaded pins, or comparable connecting elements can be passed. The recess is configured, for example, as a through bore. The recess is alternatively configured as blind bore. The recess is optionally configured as a slot.

A support structure is understood to mean, for example, a floor plate of a rail vehicle. A further example for a support structure is a steel support which is designed for connection to a cable connection housing. A support structure can furthermore be formed from a different load-bearing material. The support structure is ideally formed from an electrically conductive material. A support structure which has an advantageous thermal conductivity coefficient is particularly advantageous. An "advantageous thermal conductivity coefficient" here means a high thermal conductivity.

In an expedient embodiment, the recesses are each arranged inside at least one protrusion situated on the outside of the cable connection housing.

A protrusion here means, for example, a piece of sheet metal attached to the cable connection housing. The protrusion projects in particular beyond the basic shape of the cable connection housing. The housing top side of a cable connection housing is particularly preferably formed with protrusions. The housing top side is ideally shaped so that it is fundamentally rectangular. On two opposite sides, the housing top side here has in each case at least one protrusion with in each case at least one recess for fastening the cable connection housing.

A cable connection housing with a polygonal basic shape and a fundamentally rectangular housing top side is particularly preferred. The housing top side here projects beyond at least one side of the polygonal basic shape of the cable connection housing, wherein the recess is arranged in this projecting protrusion formed in this way.

A skillful embodiment provides that the interior has at least one first insulating shell and one second insulating shell, wherein the first insulating shell and the second insulating shell overlap each other along at least one side wall.

An insulating shell means a shaped element which is formed from a non-conductive material, in particular from a plastic. The invention is here based on a fundamentally rectangular base area of the insulating shell. The surface area is alternatively configured as polygonal. A base area is alternatively configured with a circular base area. The insulating shell thus assumes a hollow cylindrical shape.

At least approximately perpendicularly integrally formed side walls are arranged at the edges of the base area. According to the invention, the insulating shells fundamentally overlap each other at at least one and advantageously at least two side walls. The base areas of a first insulating shell and a second insulating shell here ideally are approximately congruent and/or differ in their base area only in the thickness of the corresponding insulating shell. This means that, for example, the first insulating shell has a larger base area than the second insulating shell, or vice versa. The difference in the base areas of the first insulating shell and the second insulating shell thus makes it possible for the first insulating shell to be able to accommodate the second insulating shell in it at least partially. According to the invention, a first insulating shell is laid inside the interior of the cable connection housing. The second insulating shell is inserted into the first insulating shell, mirror-inverted about an axis such that a space is fundamentally enclosed between the first insulating shell and the second insulating shell. These dimensions and/or this arrangement make it possible in a skillful way for the insulating shells to cause the side walls to be nested inside each other and hence the required air gaps and creepage distances to be increased positively.

A clever embodiment provides that the cable connection housing receives at least one closure cap for closing a connection region so that it is media-tight. In this case, a closure cap means a cap or a cover which is shaped so as to cover at least one connection region of the cable connection housing. A closure cap furthermore m a cap or cover which can be inserted into the connection region, wherein at least one housing perforation is sealed. The closure cap is ideally shaped in such a way that it is inserted into a connection region and is fixed in the connection region. The fixing of the closure cap is according to the invention at least capable of ensuring impermeability to water and/or dust. The closure cap and/or the connection region is skillfully provided with a sealing element in order to improve the sealing effect.

An embodiment which is a further development provides that the cable connection housing has a housing cover for closing the interior so that it is media-tight. The housing cover is skillfully arranged on a housing underside. The connection of the housing cover to the cable connection housing seals the interior of the cable connection housing according to the invention at least against the penetration of water and/or dust and dirt. Maintenance access is provided by the use of the housing cover. According to the invention, the housing cover is provided with a connecting element which requires a special tool to detach the housing cover from the cable connection housing. The use of a closure mechanism is also conceivable. Fundamental protection against manipulation is ensured in this way. In order to improve the protection against manipulation, the housing cover can be provided in the housing top side. According to the invention, the housing cover is consequently configured with an at least partially concave shape. The housing cover and/or the corresponding part of the cable connection housing is skillfully provided with a sealing element in order to improve the sealing effect against foreign media.

One practical embodiment provides that the housing cover has a depression for receiving a closure cap. In order to save space and to make it simpler to reach the closure cap, the arrangement of the housing cover in the housing underside is expedient here. The closure cap is here secured detachably to the housing cover with a connecting element. This embodiment is particularly smart in the case of a cable connection housing designed as a distributor. If, for example, the high-power plug connection system is configured as a Y distributor, the cable connection housing used can be used simply to fulfill multiple purposes. In one use, the high-power plug connection system designed as a Y distributor can be used as a distributor by at least three high-power plug connectors being connected to the cable connection housing. In an alternative use, the high-power plug connection system configured as a Y distributor is used as a connection system. For this purpose, two high-power plug connectors are connected to the cable connection housing and a third connection region of the cable connection housing is sealed by a closure cap.

A particularly safety-oriented embodiment proposes that the cable connection housing is provided at least on the housing top side with at least two fundamentally plane contact surfaces. The protrusions of the housing top side are skillfully formed as plane contact surfaces. These contact surfaces are ideally connected to likewise plane surfaces and fastened to these plane surfaces by connecting elements such as screws or similar connecting elements. With regard to safety, it is proposed to interconnect the surfaces without handling them. A connection with a conductive, anti-corrosion substance is also conceivable. Grounding is consequently enabled without the need for any further ground conductor. Tests have shown that as few as three screw connections, for example configured as an MG thread or larger, are sufficient to effect grounding of 150 A. The contact surfaces can be used in addition for redundant safety purposes in order to compensate for, for example, corroding screw connections. The contact surfaces can ideally be used for heat transmission. By virtue of this additional heat transmission, a particularly compact structural shape can be created because less structural space needs to be allocated as a cooling surface.

With reference to the preceding embodiment, an embodiment proposes that the contact surfaces reach the height of a plane which is formed by a straight line running fundamentally parallel to the cable connection housing and by a highest point of the concave deflection of the housing top side.

This means that the contact surfaces reach at least the same height as the at least one concave shape at its maximum deflection directed away from the cable connection housing. The contact surfaces preferably project beyond the maximum deflection of the concavely shaped housing top side. Cleaning can consequently be improved and simplified in the mounted state of the high-power plug connection system and in particular the cable connection housing. Furthermore, the formation of a gap, favored in this way, between the concave housing top side and the support structure accommodating the high-power plug connection system induces improved air circulation. This air circulation in turn induces a positive cooling effect. By virtue of this cooling effect, a compact structural shape can be created because less structural space needs to be allocated as a cooling surface.

In an embodiment which is a further development, it is provided that the housing underside is provided with at least one fundamentally plane contact surface. This contact surface is formed for connection of a ground conductor. As is known, copper strips are often used as ground conductors. These ground conductors can be used for shielded transmission as an additional safety measure. Such ground conductors can furthermore be used as alternatives to plane contact surfaces on the housing top side.

A further embodiment provides that the housing top side is formed from at least one fundamentally rectangular basic shape. This embodiment furthermore provides that the housing underside is formed from at least one fundamentally rectangular basic shape. An embodiment which is a further development, the housing underside of which is formed from at least one fundamentally rectangular basic shape and one fundamentally trapezoidal basic shape arranged thereon, is particularly preferred. The resulting polygonal basic shape is particularly suited for the use of the high-power plug connection system as a distributor. In particular when the high-power plug connection system is applied as a Y distributor, the form of the basic shape as a polygon brings advantages in terms of the volume of the cable connection housing.

An embodiment which is convenient for maintenance here moreover provides that a high-power plug connection system contains at least one thermochromic element. A thermochromic element is preferably used in the form of a sticker. Alternatively, a thermochromic element in the form of at least one paint is used. It is very particularly preferred to apply the thermochromic element below a protective or sealing layer of paint on at least one component of the high-power plug connection system. For the purpose of early fault detection and improved maintenance, it is proposed here to use a thermochromic element with an irreversible change of color. In this way, it is possible to identify directly during maintenance work a component of the high-power plug connection system which has been overloaded. In a skillful further development, an electrical and/or electromagnetic signal transmitter is associated with the thermochromic element. A signal transmitter is here configured in particular as an RFID transponder. In the case of the use of an RFID transponder, an element introduced therein for irreversibly changing the data communicated is also particularly preferred. A heat-sensitive element can thus, for example, be contained in the transponder. As an alternative, an RFID transponder is connected to a heat-sensitive element. As soon as the heat-sensitive element is activated and/or destroyed, for example by an excessively high temperature, the signal of the RFID transponder is changed such that faulty functioning can be indicated.

The disclosure furthermore relates to a current transmission system consisting of at least two high-power plug connection systems according to the invention. The high-power plug connection systems are fixed to at least one segment of a transportation system consisting of a plurality of segments and accommodate at least one electrical conductor between them.

In this case, a current transmission system is therefore understood to mean the use of at least two high-power plug connection systems according to the invention. A segment of a transportation system is understood to mean in particular part of a vehicle system, for example an articulated bus and in particular a trolleybus as an articulated bus, consisting of at least two segments. A segment is particularly preferably understood to mean a railcar of a rail vehicle and/or group of vehicles.

A further embodiment of the current transmission system proposes that at least one first high-power plug connection system is attached to a first end of the segment of the transportation system and that at least one second high-power plug connection system is assigned to an approximately central region of the segment.

An embodiment of the current transmission system furthermore provides that at least one third high-power plug connection system is attached to a second end of the segment of the transportation system.

An embodiment of the current transmission system furthermore provides that at least one fourth high-power plug connection system with fundamentally the same structure is associated with at least the first high-power plug connection system at the first end of the segment of the transportation system in order to enable safety-related technical redundancy.

An embodiment of the current transmission system furthermore provides that at least one fifth high-power plug connection system with fundamentally the same structure is associated with at least the third high-power plug connection system at the second end of the segment of the transportation system in order to enable safety-related technical redundancy. In other words, at a segment configured as a railroad car, according to the current transmission system at least the first high-power plug connection system and the fourth high-power plug connection system are situated at the first end of the segment. At least the third high-power plug connection system and the fifth high-power plug connection system are positioned at the second end, opposite the first end, of the segment. At least the second high-power plug connection system is connected to the segment in a region between the first end and the second end. In many cases, it can be expedient to use the second high-power plug connection system as a simple cable connector or to omit it altogether.

"Safety-related technical redundancy" means that a high-power plug connection system is designed to receive the electrical power to be transmitted from another high-power plug connection system that is used and to manage the situation when this fails. In other words, a high-power plug connection system can assume at least in the short term the tasks of a further high-power plug connection system that is used. This feature is required in particular in rail transportation because failures have wide-ranging consequences for a rail line and must therefore be avoided as far as possible.

A further embodiment provides a current transmission system, wherein at least the second high-power plug connection system receives at least one cable for operating at least one electrical consumer unit of the segment of the transportation system. In this way, in the case of passenger trains/railcars, for example a temperature control system, for example a heater and/or an air-conditioning unit, can be operated. In the case of railcars for transporting goods, for example, an electric servomotor and/or a comparable actuator can be supplied with power.

In a particularly expedient embodiment, at least one section of the current transmission system, visible from outside at least one high-power plug connection system, in particular at least one component of the high-power plug connection system, is provided with at least one thermochromic element. At least the operating temperature is displayed by the thermochromic element. In particular, a thermochromic element is used which performs a one-time change of color at least in the case of an elevated temperature. In a skillful further development, an electrical and/or electromagnetic signal transmitter is associated with the thermochromic element. A signal transmitter is here designed in particular as an RFID transponder. In the case of the use of an RFID transponder, an element introduced therein for irreversibly changing the communicated data is also particularly preferred. Thus, a heat-sensitive element can, for example, be contained in the transponder. As an alternative, an RFID transponder is connected to a heat-sensitive element. As soon as the heat-sensitive element is activated and/or destroyed, for example by an excessively high temperature, the signal of the RFID transponder is changed such that faulty functioning can be indicated.

BRIEF DESCRIPTION OF THE DRAWINGS

An exemplary embodiment of the invention is illustrated in the drawings and explained in detail below.

DETAILED DESCRIPTION

The drawings contain partly simplified schematic illustrations. Identical reference symbols are partly used for the same but possibly not identical elements. Different views of the same elements could be to a different scale.

Specifications of directions such as, for example, "left", "right", "above", and "below" are to be understood with reference to the respective drawing and can vary in the individual illustrations with respect to the object illustrated.

Superscript letters and numbers and subscript letters and numbers after a reference symbol are for the purpose of orientation and are intended fundamentally for the purpose of producing a simplified overview.

Figure 1:
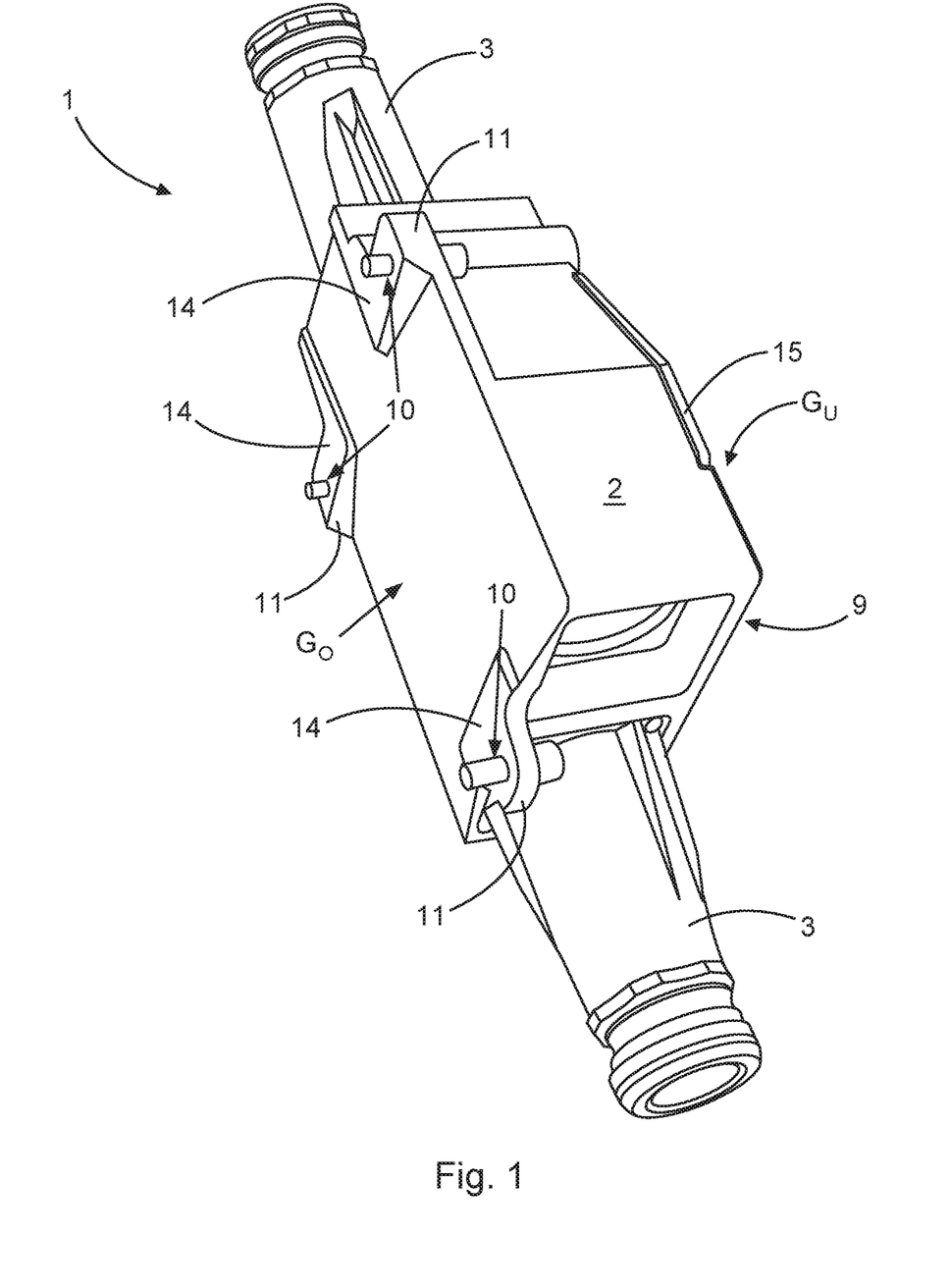
FIG. 1 shows a perspective illustration of a high-power plug connection system in a view from "above."

FIG. 1 shows a high-power plug connection system 1 according to the invention in a perspective view from "above". In this case, the high-power plug connection system 1 illustrated has a cable connection housing 2 and two high-power plug connectors 3 fastened thereon. The high-power plug connectors 3 are inserted into connection regions 9 of the cable connection housing 2 and fixed there to the cable connection housing 2 with screw connections. Alternative options for fastening a high-power plug connector 3 to a cable connection housing 2 will be apparent to a person skilled in the art. A high-power plug connector 3 can be equipped, for example, with a locking hook mechanism such as a push-pull mechanism. A high-power plug connector 3 can be equipped with a union nut which is screwed onto an external thread, wherein the external thread is arranged on the connection region 9 of the cable connection housing 2. A high-power plug connector 3 can furthermore be provided with a threaded sleeve in order to be screwed into an internal thread arranged in the connection region 9. Retaining brackets, levers, wedges, clamping elements such as clamping arms or clamping bushes (for example, tapered bushes) can additionally be used. The housing top side ($G_O$) of the cable connection housing 2 runs concavely, wherein the highest deflection of the housing top side ($G_O$) is in the longitudinal axis of the cable connection housing 2. Protrusions 11 can be seen along the basic body of the cable connection housing 2. These protrusions 11 are provided with recesses 10. These recesses 10 are configured as through bores or through holes. In the illustration in FIG. 1, these recesses 10 are already provided with connecting elements, to be more precise with screws. The latter are screwed into a support structure, for example the chassis or a floor plate of a railroad car, and connected to threaded elements. Unlike the majority of the housing top side ($G_O$), the protrusions 11 are not concave and instead configured at least fundamentally as plane contact surfaces 14. In order to obtain particularly advantageous electrical grounding, these plane contact surfaces 14 are connected to electrically conductive surfaces of the supporting component. This contact is subsequently sealed, for example by paint, to protect it from dirt and the weather. The contact surfaces 14 are furthermore provided to dissipate heat that is created in the cable connection housing 2.

In the illustration in FIG. 1, the contact surfaces 14 of the protrusions 11 protrude beyond the highest deflection of the concavely configured housing top side ($G_O$). It is thus obtained, on the one hand, that heat that is created is discharged during travel by an enabled airflow. Cleaning is furthermore simplified because dirt, dust, and water can run off or can be discharged simply on the sides of the cable connection housing 2.

Figure 2:
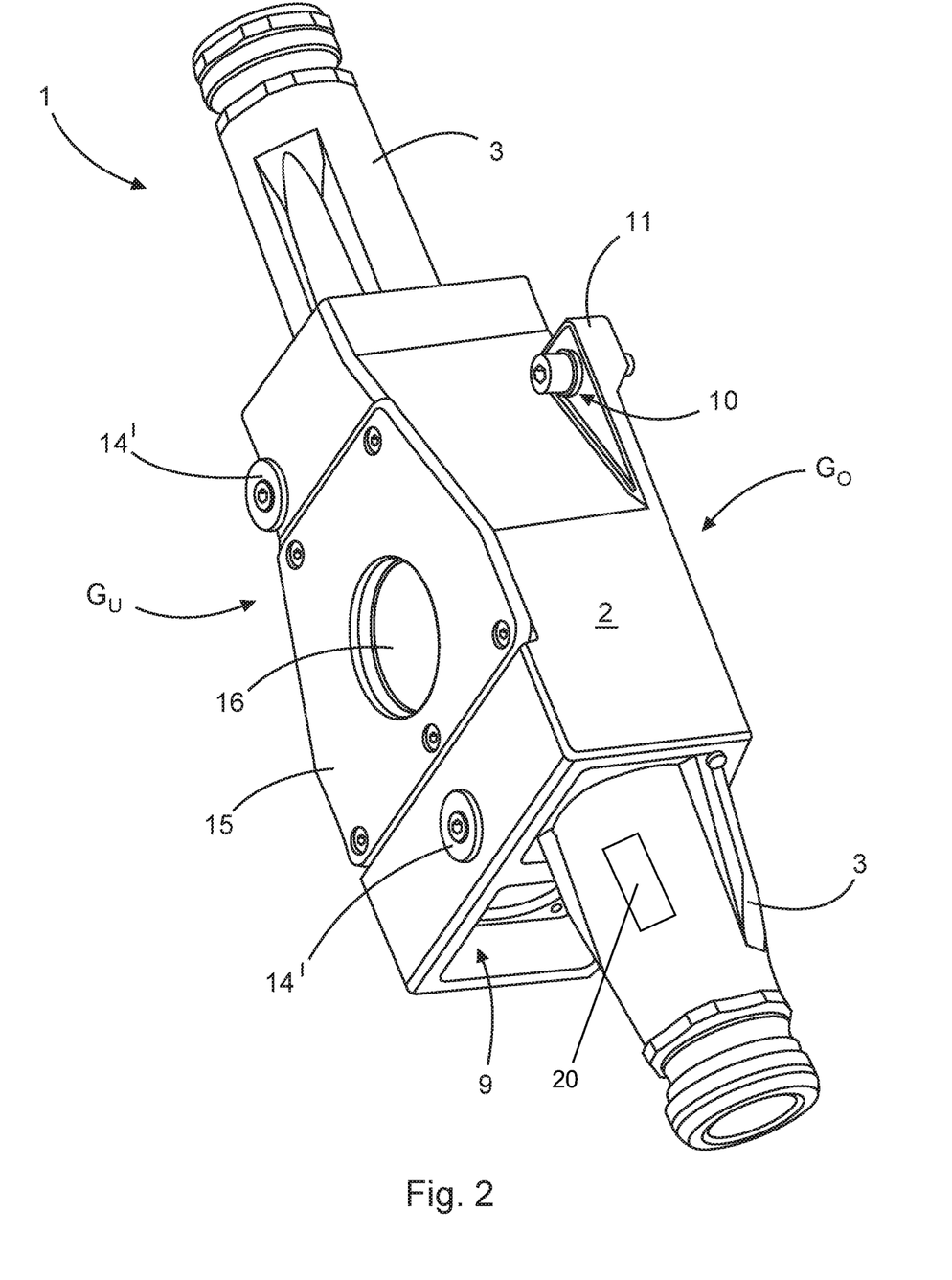
FIG. 2 shows a perspective illustration of a high-power plug connection system in a view from "below."

FIG. 2 shows the high-power plug connection system 1 according to the invention in a view from "below". The cable connection housing 2 is also connected to two high-power plug connectors 3 in FIG. 2. As in FIG. 1, a connection region 9 for a further high-power plug connector 3 is illustrated, unoccupied. The recess 10 in the protrusion 11 is already traversed by a connecting element. The connecting element, such as the screw illustrated, serves, for example, to fix the cable connection housing 2 to a support structure. A connecting element is furthermore designed to establish electrical grounding. The housing underside $G_U$ has two contact surfaces 14. These contact surfaces 14 are designed in particular for connection of at least one ground conductor. A copper mesh tape is often used as a ground conductor. The housing underside $G_U$ is provided with a housing cover 15. The interior 7 can be reached through the housing cover 15 for mounting and/or maintenance purposes. The housing cover 15 is furthermore formed with a depression 16. This depression 16 in turn is formed in such a way that a closure cap 13 can be accommodated in the depression 16 at least to a small extent. The closure cap 13 can ideally be connected detachably to the housing cover 15 by connecting elements, for example screws.

Figure 3:
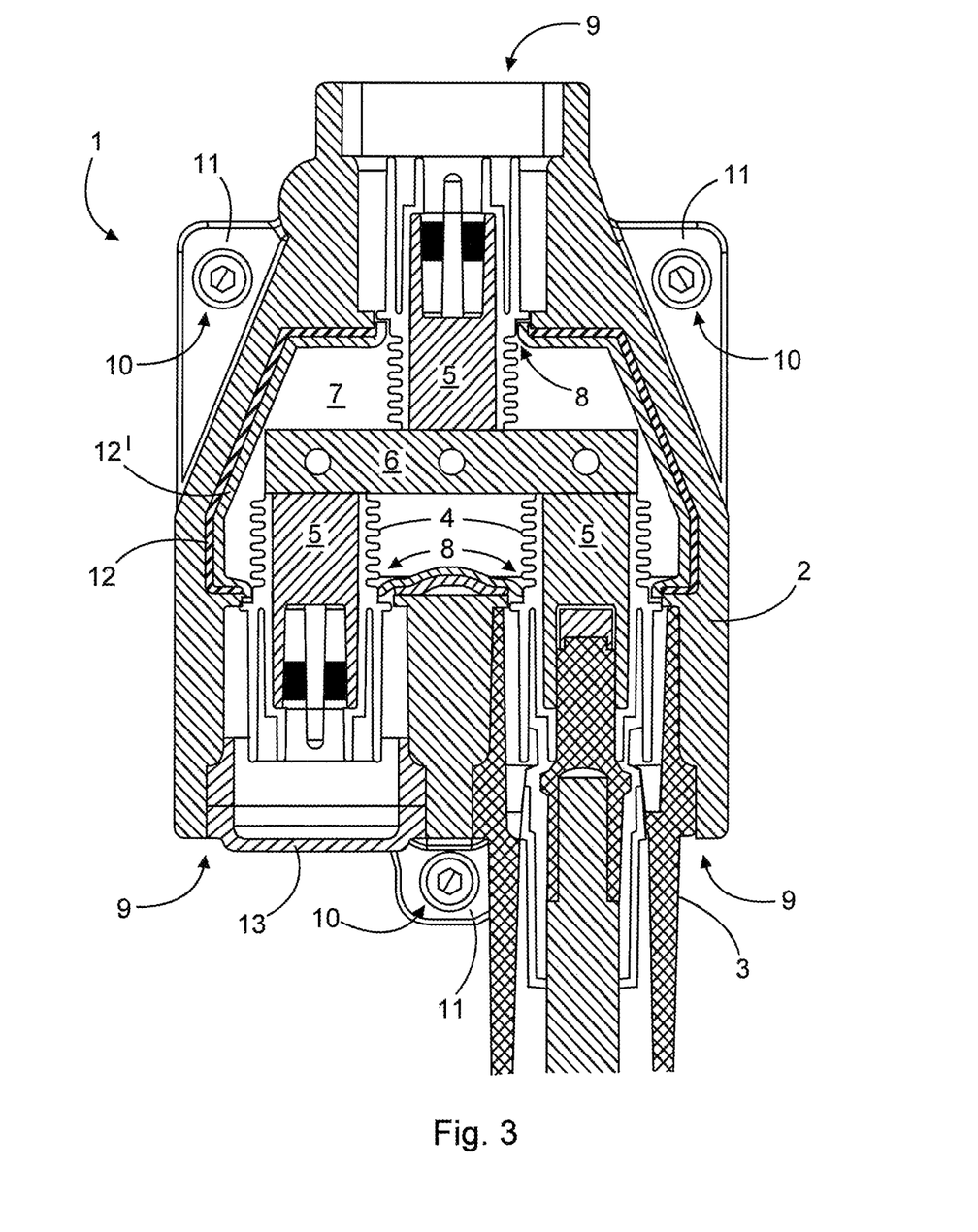
FIG. 3 shows an illustration in section through an approximately centrally positioned, horizontally oriented plane of a high-power plug connection system.
Figure 4:
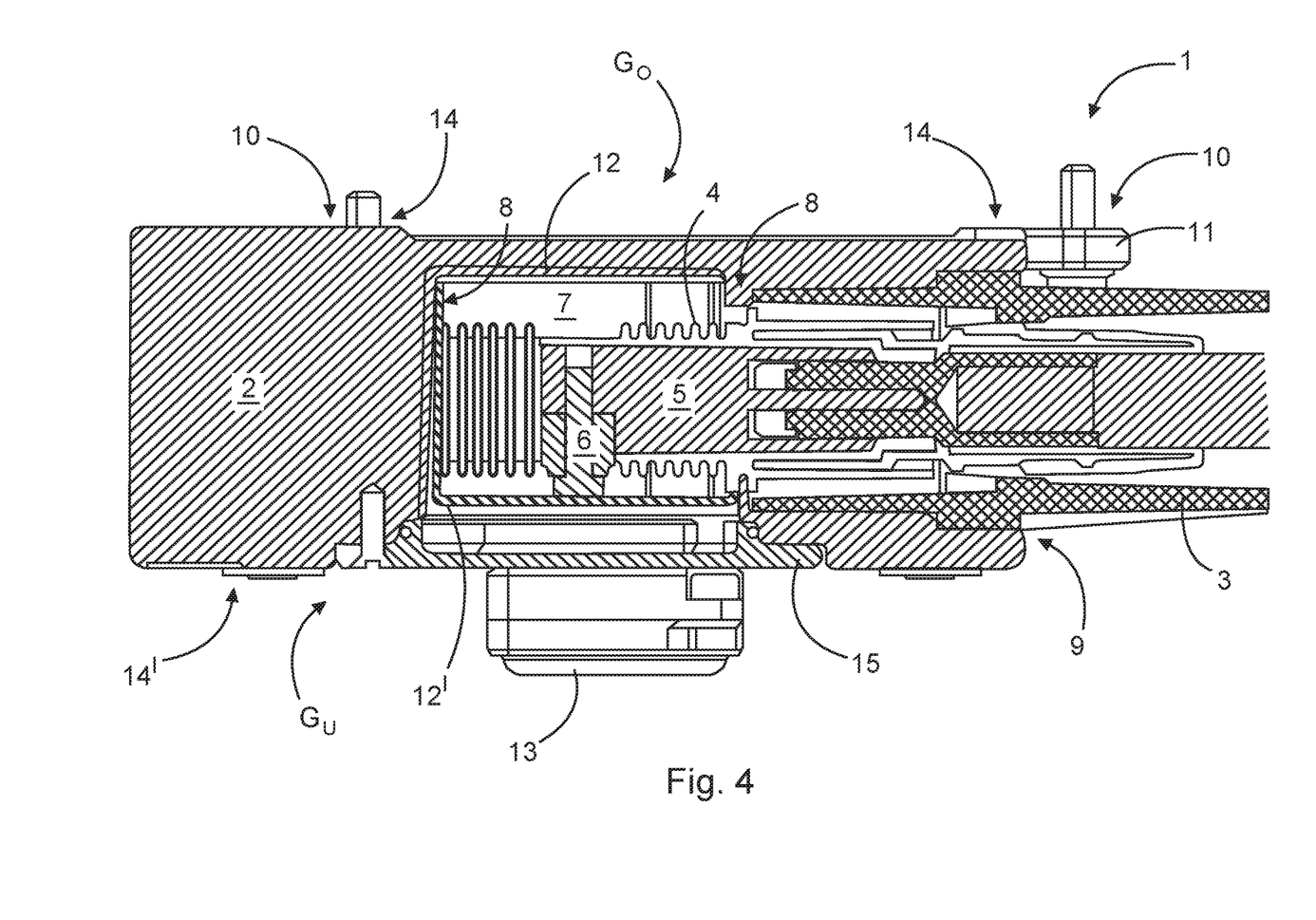
FIG. 4 shows an illustration in section through an approximately centrally positioned, vertically oriented plane of a high-power plug connection system.

FIG. 3 and FIG. 4 enable a view of the interior 7. These views show, in the case of FIG. 3, a high-power plug connection system 1 in a horizontal illustration in section and, in the case of FIG. 4, a high-power plug connection system 1 in a vertical illustration in section. FIG. 3 shows the cable connection housing 2 with a high-power plug connector 3 in a connection region 9, and a closure cap 13 in an adjacent connection region 9, whilst one connection region 9 is illustrated as unused. Three individually positioned insulating bodies 4 are arranged in the interior 7. In the case illustrated, the very rough shape of an (inverted) Y is assumed. The insulating bodies 4 run through associated housing perforations 8 and thus establish a connection between the interior 7 and the respective connection regions 9. The insulating bodies 4 furthermore each have a high-power contact 5. The high-power contacts 5 are guided through the insulating bodies 4 and through the housing perforations 8 into the respective connection region 9. The high-power contacts 5 are fixed to a busbar 6 approximately centrally in the interior 7 in order to establish an electrical connection. In the embodiment illustrated, the high-power contacts 5 are fastened to the busbar 6 by screws. The illustrations in FIG. 3 and FIG. 4 also show that there is no electrically conductive component in direct contact with the cable connection housing 2. By virtue of this design, despite the particularly compact structure of the high-power plug connection system 1, the required air gaps and creepage distances can be observed. In order to further increase protection, the interior 7 is provided with two insulating shells 12 and 12' which are nested inside each other. For this purpose, the insulating shell 12' is configured so that it is slightly smaller than the insulating shell 12 such that the insulating shell 12' is inserted into the insulating shell 12.

Figure 5:
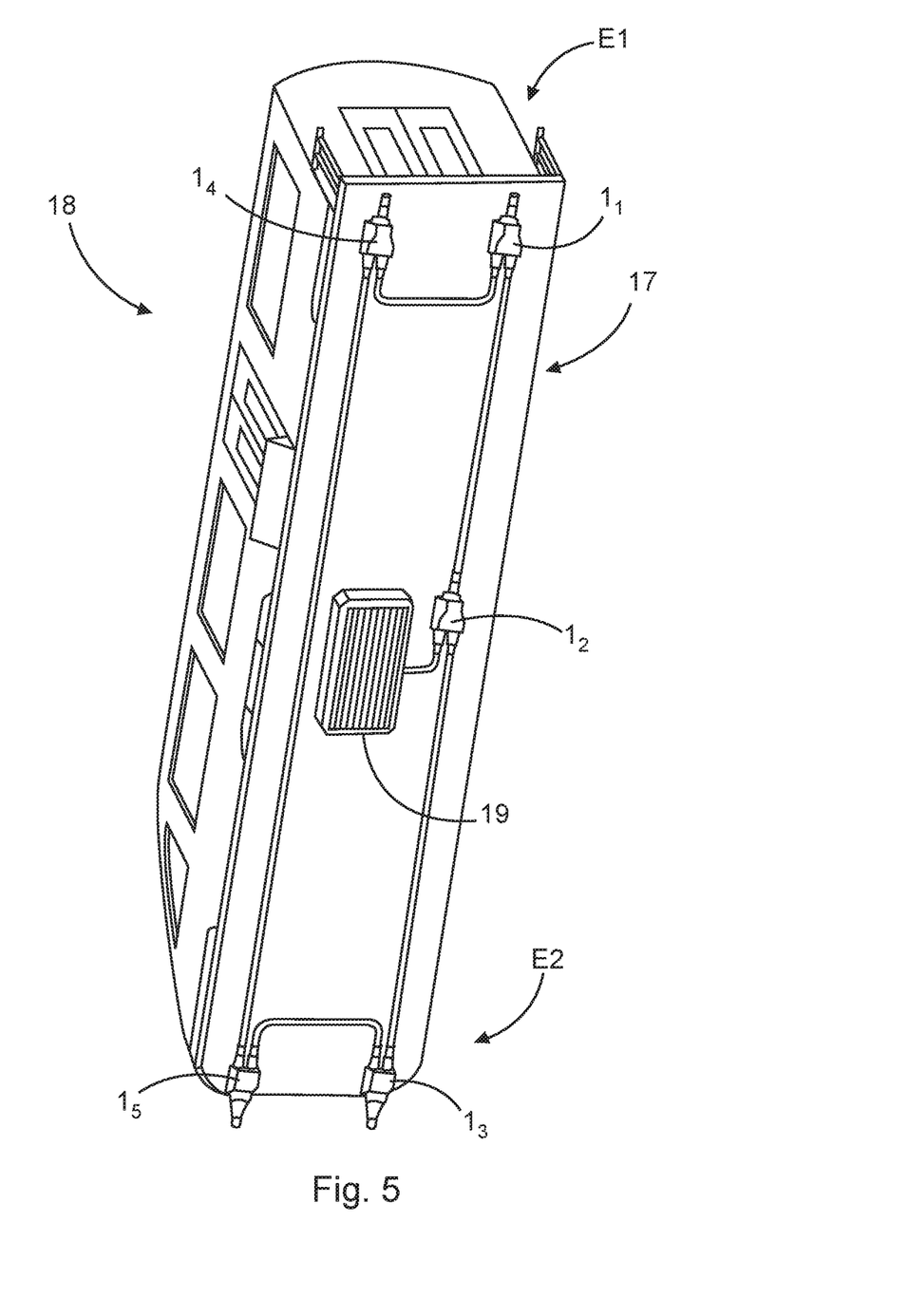
FIG. 5 shows a current distribution system in a view below a railcar which is equipped therewith.

A current transmission system 17 consisting of the high-power plug connection systems 1 according to the invention is illustrated in FIG. 5. In addition, a first high-power plug connection system $1_1$ is fastened at a first end E1 of a segment 18 of a transportation system. The transportation system is, for example, a passenger transport railcar. A first high-power plug connection system $1_1$ is connected to a second high-power plug connection system $1_2$ with the same structure. The second high-power plug connection system $1_2$ is connected to a third high-power plug connector $1_3$ by an electrical conductor. The first high-power plug connection system $1_1$ is connected to a fourth high-power plug connection system $1_4$ in order to produce redundancy. This fourth high-power plug connection system $1_4$ is linked electrically conductively directly to a fifth high-power plug connection system $1_5$. For redundancy reasons, the high-power plug connection systems $1_5$ and $1_3$ are furthermore in electrically conductive contact. The high-power plug connection systems $1_1$ and $1_4$ are thus situated at the first end E1 of the segment 18. The high-power plug connection systems $1_3$ and $1_5$ are situated at the opposite end E2 of the segment 18. An electrical consumer unit 19 is situated between the two ends E1 and E2 of the segment 18. This electrical consumer unit 19 can be, for example, a temperature control system, in particular an air-conditioning unit or an electrical heating unit. The electrical consumer unit 19 is connected to the high-power plug connection system $1_2$ by an electrical line. The high-power plug connection systems 1 here have the same structure and are interchangeable as required. The high-power plug connection systems $1_1$, $1_2$, and $1_3$ here form an electrical connection from the first end E1 of the segment 18 to the second end E2 of the segment 18. The high-power plug connection system $1_2$ here acts not only as an electrical connection but also as a branching option for supplying power to an electrical consumer unit. The high-power plug connection systems $1_4$ and $1_5$ form a further electrical connection from the first end E1 of the segment 18 to the second end E2 of the segment 18.

Even though different aspects or features of the invention are shown in the drawings in each case in combination, unless otherwise stated, it is clear to a person skilled in the art that the combinations illustrated and discussed are not the only ones possible. In particular, corresponding units or bundles of features from different exemplary embodiments can be interchanged.

LIST OF REFERENCE SYMBOLS 1 high-power plug connection system
2 cable connection housing
3 high-power plug connector
4 insulating body
5 high-power contact
6 busbar
7 interior
8 housing perforation
9 connection region
10 recess
11 protrusion
12, 12' insulating shell
13 closure cap
14, 14' contact surface
15 housing cover
16 depression
17 current transmission system
18 segment
19 consumer unit
20 thermochromic element
$G_O$ housing top side
$G_U$ housing underside E1 first end of the segment
E2 second end of the segment

The invention claimed is:

1. A high-power plug connection system (1), comprising:
a cable connection housing (2) for connecting at least two electrical high-power plug connectors (3) for transmitting and/or distributing high electrical current strengths and/or high electrical voltages,
wherein the cable connection housing (2) comprises
at least two insulating bodies (4), each of the at least two insulating bodies (4) accommodating at least one of at least two high-power contacts (5), and
at least one electrically conductive busbar (6) in an interior (7),
wherein the busbar (6) is designed to establish an electrically conductive connection between the at least two high-power contacts (5),
wherein each of the at least two insulating bodies (4) projects at least partially through a respective housing perforation (8) from the interior (7) into a connection region (9) of the cable connection housing (2),
wherein the connection region (9) is designed to receive the at least two electrical high-power plug connectors (3), and
wherein the housing cover (15) has a depression (16) for receiving a closure cap (13).

2. The high-power plug connection system (1) as claimed in claim 1,
wherein the cable connection housing (2) is designed with an essentially concave housing top side ($G_O$).

3. The high-power plug connection system (1) as claimed in claim 1,
wherein the cable connection housing (2) has at least two recesses (10) which make it possible to connect the cable connection housing (2) to a support structure.

4. The high-power plug connection system (1) as claimed in claim 3,
wherein the recesses (10) are each arranged inside at least one protrusion (11) situated on an outside of the cable connection housing (2).

5. The high-power plug connection system (1) as claimed in claim 1,
wherein the cable connection housing (2) receives at least one closure cap (13) for closing a connection region (9) so that it is media-tight.

6. The high-power plug connection system (1) as claimed in claim 1,
wherein the cable connection housing (2) has a housing cover (15) for closing the interior (7) so that it is media-tight.

7. The high-power plug connection system (1) as claimed in claim 1,
wherein the cable connection housing (2) is provided at least on a housing top side ($G_O$) with at least two fundamentally planar contact surfaces (14).

8. The high-power plug connection system (1) as claimed in claim 7,
wherein the contact surfaces (14) reach a height of a planar which is formed by a straight line running fundamentally parallel to the cable connection housing (2) and by a highest point of a concave deflection of a housing top side ($G_O$).

9. The high-power plug connection system (1) as claimed in claim 1,
wherein a housing underside ($G_U$) is provided with at least one fundamentally planar contact surface (14').

10. The high-power plug connection system (1) as claimed in claim 9,
wherein the fundamentally planar contact surface (14') is formed for connection of a ground conductor.

11. The high-power plug connection system (1) as claimed in claim 1,
wherein a housing underside ($G_U$) is formed from at least one essentially rectangular basic shape.

12. The high-power plug connection system (1) as claimed in claim 1,
wherein the high-power plug connection system (1) has at least one thermochromic element.

13. A current transmission system (17) having at least two high-power plug connection systems as claimed in claim 1,
wherein at least one first high-power plug connection system (11) is attached to a first end (E1) of a segment (18) of a transportation system and at least one second high-power plug connection system (12) is assigned to an approximately central region of the segment (18).

14. The current transmission system (17) as claimed in claim 13,
wherein at least one third high-power plug connection system (13) is attached to a second end (E2) of the segment (18) of the transportation system.

15. The current transmission system (17) as claimed in claim 14,
wherein at least one fourth high-power plug connection system (14) with essentially the same structure is associated with at least the first high-power plug connection system (11) at the first end (E1) of the segment (18) of the transportation system in order to enable safety-related technical redundancy.

16. The current transmission system (17) as claimed in claim 15,
wherein at least one fifth high-power plug connection system (15) with essentially the same structure is associated with at least the third high-power plug connection system (13) at the second end (E2) of the segment (18) of the transportation system in order to enable safety-related technical redundancy.

17. The current transmission system (17) as claimed in claim 13,
wherein at least the second high-power plug connection system (12) receives at least one cable for operating at least one electrical consumer unit (19) of the segment (18) of the transportation system.

18. The current transmission system (17) as claimed in claim 14,
wherein at least the first high-power plug connection system (11) and the third high-power plug connection system (13) are connected by at least one electrical cable.

19. The current transmission system (17) as claimed in claim 16,
wherein at least the fourth high-power plug connection system (14) and the fifth high-power plug connection system (15) are connected by at least one electrical cable.

20. The current transmission system (17) as claimed in claim 14,
wherein at least the first high-power plug connection system (11) and the third high-power plug connection system (13) are connected to the second high-power plug connection system (12) by in each case at least one electrical cable.

21. The current transmission system (17) as claimed in claim 13, wherein at least one high-power plug connection system (1) is provided with at least one thermochromic element.

22. A high-power plug connection system (1), comprising:
a cable connection housing (2) for connecting at least two electrical high-power plug connectors (3) for transmitting and/or distributing high electrical current strengths and/or high electrical voltages,
wherein the cable connection housing (2) comprises
at least two insulating bodies (4), each of the at least two insulating bodies (4) accommodating at least one of at least two high-power contacts (5) and
at least one electrically conductive busbar (6) in an interior (7),
wherein the busbar (6) is designed to establish an electrically conductive connection between the at least two high-power contacts (5),
wherein each of the at least two insulating bodies (4) projects at least partially through a respective housing perforation (8) from the interior (7) into a connection region (9) of the cable connection housing (2),
wherein the connection region (9) is designed to receive the at least two electrical high-power plug connectors (3),
wherein the interior (7) has at least one first insulating shell (12) and one second insulating shell (12'), and
wherein the first insulating shell (12) and the second insulating shell (12') overlap each other along at least one side wall.

23. A high-power plug connection system (1), comprising:
a cable connection housing (2) for connecting at least two electrical high-power plug connectors (3) for transmitting and/or distributing high electrical current strengths and/or high electrical voltages,
wherein the cable connection housing (2) comprises
at least two insulating bodies (4), each of the at least two insulating bodies (4) accommodating at least one of at least two high-power contacts (5) and
at least one electrically conductive busbar (6) in an interior (7),
wherein the busbar (6) is designed to establish an electrically conductive connection between the at least two high-power contacts (5),
wherein each of the at least two insulating bodies (4) projects at least partially through a respective housing perforation (8) from the interior (7) into a connection region (9) of the cable connection housing (2),
wherein the connection region (9) is designed to receive the at least two electrical high-power plug connectors (3),
wherein the high-power plug connection system (1) has at least one thermochromic element, and
wherein the thermochromic element is arranged in a region visible from outside the high-power plug connection system (1).

* * * * *